United States Patent [19]

Odazima et al.

[11] 4,137,884
[45] Feb. 6, 1979

[54] MAGNETO FOR MOTOR VEHICLE

[75] Inventors: Mituo Odazima; Rokuro Kikuchi; Arata Ataka, all of Katsuta, Japan

[73] Assignee: Hitachi, Ltd., Japan

[21] Appl. No.: 705,528

[22] Filed: Jul. 15, 1976

[30] Foreign Application Priority Data

Jul. 25, 1975 [JP] Japan ................................. 50-90091

[51] Int. Cl.² ............................................. F02P 1/00
[52] U.S. Cl. ............................ 123/149 D; 310/153; 310/156
[58] Field of Search ............. 310/153, 74, 156, 154, 310/67, 42, 91, 171; 29/598; 322/48, 51; 123/148 CC, 149 D

[56] References Cited

U.S. PATENT DOCUMENTS

| | | | |
|---|---|---|---|
| 2,060,881 | 11/1936 | Linthwaite | 123/149 D |
| 2,583,466 | 1/1952 | Brownlee | 123/149 D |
| 3,258,623 | 6/1966 | Phelon | 310/156 |
| 3,265,913 | 8/1966 | Irwin | 310/153 |
| 3,818,586 | 6/1974 | Harkness | 29/598 |
| 3,828,212 | 8/1974 | Harkness | 310/153 |
| 3,974,817 | 8/1976 | Henderson | 123/149 D |
| 4,012,651 | 3/1977 | Burson | 310/153 |

FOREIGN PATENT DOCUMENTS

| | | | |
|---|---|---|---|
| 2223682 | 1/1973 | Fed. Rep. of Germany | 310/153 |
| 850193 | 9/1957 | United Kingdom | 310/153 |

*Primary Examiner*—R. Skudy
*Attorney, Agent, or Firm*—Craig & Antonelli

[57] ABSTRACT

A magneto for a motor vehicle includes a flywheel having an exciting source and adapted to rotate in timed relation to the engine, and an armature to be excited by the exciting source. It also comprises an elastic steel cover on at least the inner surfaces of its magnet elements, so that the elements are pressed against, and positioned with respect to, the inner surface of the rim of tray-shaped flywheel.

15 Claims, 8 Drawing Figures

MAGNETO FOR MOTOR VEHICLE

BACKGROUND OF THE INVENTION

This invention relates to a magneto for a motor vehicle, and more specifically to an assembly of such a magneto in which magnet elements are solidly secured to the inner peripheral surface of the rim of a tray-shaped flywheel.

Generally, magnetos for motorcycles are built so that a set of permanent magnet elements disposed on the inner peripheral surface of a flywheel is rotated and the rapid changes in flux thereby induced in the armature are utilized in generating energy output.

Flywheels for such magnetos in wide use include those (1) based on aluminum in which magnet elements are embedded, (2) made of iron, with magnet elements disposed on the inner peripheral surface of the flywheel rim and fastened thereto by screws from the outside, or (3) made of iron, with magnet elements on the inner peripheral surface of the flywheel rim encased in a casing of nonmagnetic material such as plastics and then secured to the inner peripheral surface.

Of those conventional flywheels, the type (1) provides practically perfect protection for the magnet elements but, being cast in most cases, it has been undesirable because of poor machinability and high material cost.

The type (2), in which magnet elements are screwed to the iron flywheel rim, requires much time in the screwing with an adverse effect on the assembly efficiency. The type (3) that uses encased magnet elements makes it necessary to fabricate the plastic casing separately and then attach the casing to the inner peripheral surface of the flywheel rim, again at a sacrifice of the production efficiency of magneto manufacture. U.S. Pat. No. 3,258,623 teaches another method of fixing magnet elements in palce. However, it does not attempt at thinning the pole pieces or increasing the thickness of the magnet elements, and therefore fails to improve the output capacity. In addition, it too depends on screws for the fixing of elements, with no improvement in productivity.

SUMMARY OF THE INVENTION

It is a primary object of this invention to provide a magneto in which magnet elements disposed on the inner peripheral surface of the rim of a flywheel are secured in position with high productivity.

Another object of the invention is to provide a magneto in which magnet elements are secured to the inner peripheral surface of the flywheel rim without impairing the generator output.

Yet another object of the invention is to provide a magneto in which magnet elements are solidly secured to the inner peripheral surface of the flywheel rim under restrictions on their radial and axial movements, without impairing the generator output, so as to preclude any trouble due to breakdown of the elements.

In accordance with the present invention a magnet element assembly for magneto is provided in which magnet elements are fitted in position without fastening by screws. The assembly comprises magnet elements disposed on the inner peripheral surface of a flywheel rim and a holder for holding the elements. The holder is in the form of a ring-shaped thin strip having a contour such that it makes close contact with at least the inner arcuate surfaces of the elements and are secured thereto without resort to the mechanical fasteners. The ring-shaped holder preferably includes a spring steel ring for covering the inner arcuate surfaces of the magnet elements and nonmagnetic rings for covering the both sides of the elements to restrict the movements of the elements both in the axial direction and in the direction of rotation.

DESCRIPTION OF THE PREFERRED EMBODIMENTS

Figure 1:
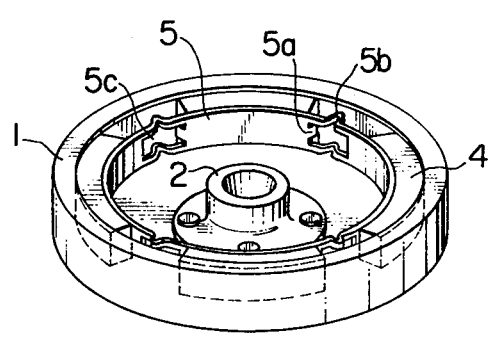
FIG. 1 is a perspective view of an embodiment of a magneto for motor vehicle of the invention.
Figure 2:
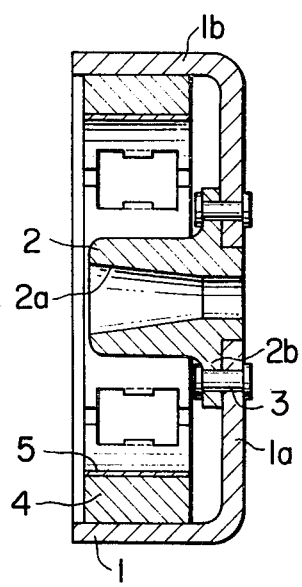
FIG. 2 is a cross sectional view of the embodiment shown in FIG. 1.

Referring to FIGS. 1 and 2, there is shown a tray shaped flywheel 1 of iron adapted to rotate in timed relation to an internal-combustion engine, e.g., of a motorcycle. Inside the flywheel 1, a hollow centerpiece 2 with an expanding bore 2a at one end to receive the engine crankshaft (not shown) protruding outwardly from the vehicle body, is secured in position with a flange 2b near its opposite end fastened to the bottom 1a of the flywheel by rivets 3. The flywheel 1 carries, on the inner peripheral surface of its rim 1b, four arcuately-shaped magnet pole elements of ferritic magnetic steel (to be called simply "magnet elements" hereinafter) 4 in a substantially equidistant, alternate-polarity arrangement. These magnet elements 4 are held in positon and pressed against the inner peripheral surface of the rim 1b from the inside by a ring-shaped magnet element holder 5 of spring steel. The magnet elements are then integrally made fast to the flywheel 1 by a dip in an adhesive varnish solution.

The ring-shaped magnet element holder 5 of magnetic material is formed with tongues 5a for positioning the sides of magnet elements 4, inverted-V projections 5b for stress absorption between the adjacent magnet elements, and windows 5c for lessening magnetic leakage. The magnet elements 4 and holder 5 are secured together to the inner surface of the flywheel rim 1b in the following manner. The holder 5 with an initial outside diameter somewhat larger than the actual fitting dimension is combined with the magnet elements 4, the latter being properly positioned by the tongues 5a. Then, the magnet elements 4 and holder 5 are both press fitted into the flywheel 1 and against the inner peripheral surface of the rim 1b. As it is forced into the flywheel 1, the holder exerts a spring action to secure the magnet elements with a predetermined pressure to the inner surface of the rim 1b of the flywheel. The stresses that result from the press fit of the holder are absorbed by the inverted-V projections 5b formed on the portions of the holder corresponding to the gaps between the magnet elements, whereby the deformation of the holder toward the inner rim surface is avoided.

Figure 3:
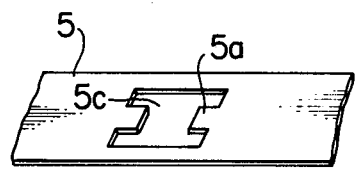
FIG. 3 is a fragmentary perspective view of a metal strip stamped out to form a magnet element holder for the embodiment of FIG. 1.
Figure 4:
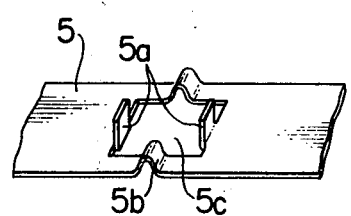
FIG. 4 is a fragmentary perspective view of the metal strip of FIG. 3 worked to be a magnet element holder.
Figure 5:
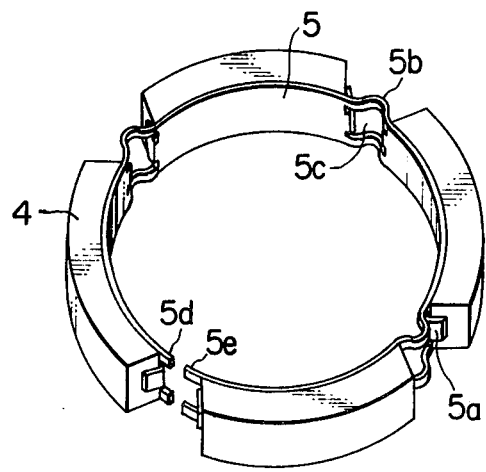
FIG. 5 is a perspective view of a subassembly of magnet elements and holder of the embodiment shown in FIG. 1.

FIGS. 3, 4 and 5 illustrate how the magnet element holder 5 for the embodiment just described is made. Initially, as shown in FIG. 3, a strip of magnetic metal plate is punched out on a press to leave generally H-shaped holes behind, thus forming tongues 5a and windows 5c at the same time. Next, as in FIG. 4, the tongues 5a are bent in the same direction and side frames of each window are folded to provide inverted-V projections 5b. Finally, as in FIG. 5, the strip is rounded to a ring form, the cut ends 5d, 5e being abutted to form the fourth combination of tongues, projections, and a window, thus concluding the fabrication of a magnet element holder 5.

The present invention offers the following advantages:

(1) Since the magnet elements and holder are simultaneously press fitted, the magneto assembling work can be greatly simplified and automatized. Moreover, the material and machining costs are lower than in conventional fabrication methods and, with all other expenses combined, the total cost of the flywheel assembly according to the invention will be from 10 to 15% less than those of existing assemblies.

(2) Compared with conventional magnet element holding frames associated with pole pieces in flywheels of the same size, the holder of the invention is reduced in thickness, allowing for a corresponding increase in the thickness of the magnet elements. The thicker magnet elements will make up for the deterioration of electrical properties due to leakage through the connecting portions of the holder (of magnetic material) for the magnet elements.

Usually the ordinary magneto assemblies, in which pole pieces are bonded to magnet elements and secured together to flywheels by screws, require pole pieces ranging in plate thickness from 2 to 3 mm. By contrast, a thickness of only about 0.5 mm will suffice for the holder 5 made of spring steel in accordance with the invention and, accordingly, the thickness of the individual magnet elements 4 may be increased by about 2 to 3 mm. The external size and shape being the same, the magneto incorporating the invention will thus have a 10 to 20% greater output capacity than the ordinary magnetos.

Figure 6:
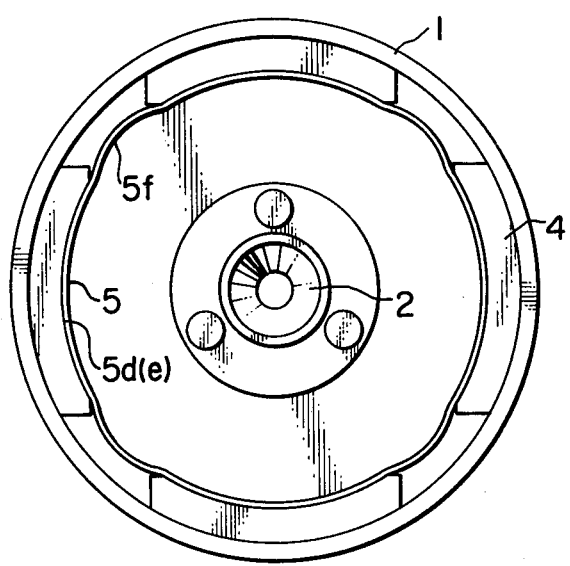
FIG. 6 is a front view of another embodiment of a magneto for motor vehicle of the invention.

FIG. 6 shows another preferred embodiment of the invention, in which like components of the same functions as in the embodiment of FIGS. 1 through 5 are referred to by like numerals. This embodiment is the same as the preceding embodiment except that the magnet element holder 5 is not formed with the tongues 5a but with radial bulges 5f, which provide sufficient spring action to press the magnet elements securely against the inner surface of the flywheel rim and circumferentially position the elements with respect to the rim. It will be readily understood by those skilled in the art that this construction eliminates the process of stamping out the holder plate material and thereby enhances the efficiency of magneto production even more remarkably.

Figure 7:
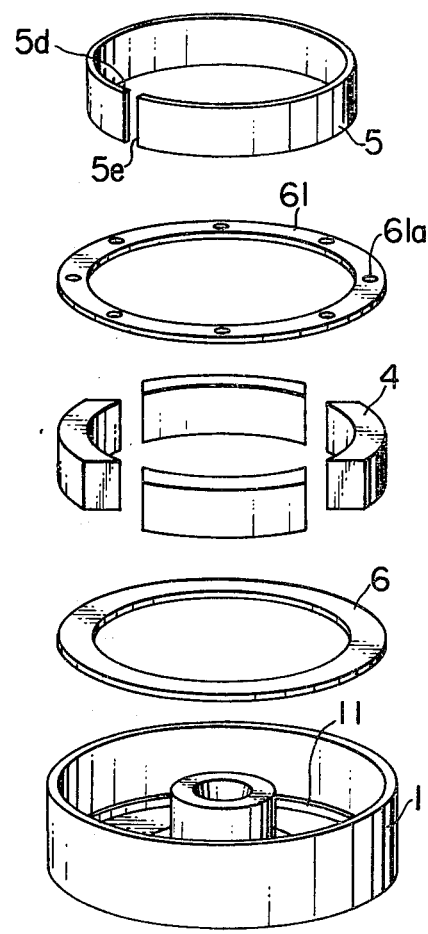
FIG. 7 is an exploded perspective view of still another embodiment of the invention.
Figure 8:
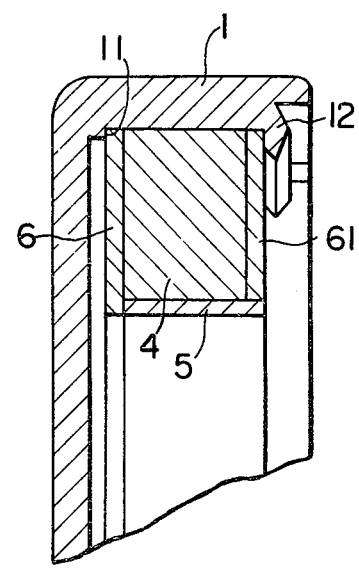
FIG. 8 is a fragmentary sectional view of the embodiment of FIG. 7 as assembled.

FIGS. 7 and 8 show still another embodiment of the invention. Throughout these and preceding figures, of course, like numerals are used to designate like or corresponding parts. This embodiment differs from the previous ones in that the magnet elements 4 are completely covered by a magnet element positioning holder 5 and also by a first side ring 6 and a second side ring 61, both of nonmagnetic material, so that the elements may be kept from falling off when broken during the magneto operation.

In this embodiment the flywheel 1 has an annular step 11 on its inner corner, on which the first side ring 6 and then the magnet elements 4 are placed, and the magnet element holder 5 is fitted to press the elements securely against the inner peripheral surface of the flywheel rim. Next, the second side ring 61 is attached to the opposite side of the magnet elements, and desirably the inner peripheral edge 12 of the flywheel is either calked inwardly at regular intervals on a press or curled all along the second side ring 61 on a curling machine.

In the embodiment being described, the first side ring 6 is made smaller in inside diameter than the four magnet elements 4 combined, lest the magnet element holder 5 should be inserted too deep into the tray-shaped flywheel, whereas the inside diameter of the second side ring 61 is substantially equal to that of the combined magnet elements 4. Also, the holder 5 has an outside diameter slightly larger than the inside diameter of the magnet element 4, so that after insertion the holder can exert a positive spring action on the elements and press the latter against the inner peripheral surface of the flywheel rim. It is preferred from the viewpoint of productivity that the second side ring 61 be formed with several holes 61a to be filled with adhesive for its efficient flow thereover during the subsequent assembling work.

With the construction described, the magneto according to the invention comprises the magnet elements secured in position by the backing of the ring-shaped spring steel strip. The elimination of the separate pole pieces and fitting screws of the ordinary structures contributes greatly to the enhancement of the magneto assembling efficiency. Furthermore, the magnet elements can be as thick as the conventional elements and pole pieces combined, and therefore, the shape and size bieng the same, the magneto of the invention can achieve a corresponding improvement in the output capacity over the ordinary magnetos.

While the magnet elements in the magneto of the invention are made of ferritic magnetic steel, the common material of low impact strength, there is no possiblity of any broken elements flying out of the flywheel. This renders the generator highly safe and reliable in operation.

What is claimed is:

1. In a magneto for a motor vehicle including a flywheel adapted to be driven in timed relation to the engine and a set of magnet elements secured as an excitation source to the inner peripheral surface of the rim of said flywheel, the improvement comprising a ring-shaped magnet element holder of spring steel capable of expanding outwardly and fitted to the inner peripheral surfaces of said magnet elements and secured altogether to said inner peripheral surface of said flywheel rim with adhesive.

2. A magneto as claimed in claim 1, wherein said magnet element holder has several outwardly protruding or bulging portions, which are located in the gaps between the adjacent magnet elements so that said portions can also position said elements in the direction of rotation with respect to said inner peripheral surface of said flywheel rim.

3. A magneto as claimed in claim 1, wherein said magnet element holder has outwardly extending tongues in the portions corresponding to the gaps between the adjacent magnet elements so as to engage the sides of said elements and thereby prevent the movement of said elements in the direction of rotation.

4. In a magneto for a motor vehicle including a flywheel adapted to be driven in timed relation to the engine and a set of magnet elements secured as an excitation source to the inner peripheral surface of the rim of said flywheel so that the magneto generates energy output with the running of the engine, the improvement comprising a first and a second side rings of nonmagnetic material covering the both sides of said magnet elements, and a magnet element holder of spring steel capable of expanding outwardly and fitted to the inner peripheral surfaces of said magnet elements and secured altogether to said inner peripheral surface of said flywheel rim with adhesive.

5. A magneto as claimed in claim 4, wherein said first side ring is axially positioned by an annular step formed on the inner corner of said flywheel, and said second side ring is secured in position by one of a curled and deformed inner edge of said flywheel pressed inwardly against said second ring.

6. A magneto as claimed in claim 1, wherein said magnet element holder is fitted to the inner peripheral surfaces of said magnet elements for biasing said magnetic elements towards the inner peripheral surface of the rim of said flywheel.

7. A magneto as claimed in claim 4, wherein said magnet element holder is fitted to the inner peripheral surfaces of said magnet elements for biasing said magnetic elements towards the inner peripheral surface of the rim of said flywheel.

8. A magneto as claimed in claim 4, wherein said magnet element holder is a ring-shaped member.

9. In a magneto for a motor vehicle including a flywheel adapted to be driven in timed relation to the engine and a set of magnet elements secured as an excitation source to the inner peripheral surface of the rim of said flywheel, the improvement comprising elastic means of spring steel contacting at least the inner peripheral surfaces of said magnet elements for biasing said magnet elements outwardly towards the inner peripheral surface of said flywheel rim.

10. A magneto as claimed in claim 9, wherein said elastic means is a thin ring-shaped member contacting the inner peripheral surfaces of said magnet elements and secured therewith to the inner peripheral surface of said flywheel rim with adhesive.

11. A magneto as claimed in claim 10, wherein said ring-shaped member biases said magnetic elements outwardly and positions said magnetic elements along the inner peripheral surface of said flywheel rim.

12. A magneto as claimed in claim 11, wherein said ring-shaped member has several outwardly protruding or bulging portions, which are located in the gaps between the adjacent magnet elements so that said portions can also position said elements in the direction of rotation with respect to the inner peripheral surface of said flywheel rim.

13. A magneto as claimed in claim 11, wherein said ring-shaped member has outwardly extending tongues in the portions corresponding to the gaps between the adjacent magnet elements so as to engage the sides of said elements and thereby prevent the movement of said elements in the direction or rotation.

14. A magneto as claimed in claim 11, further comprising first and second side rings of non-magnetic material covering both sides of said magnet elements.

15. A magneto as claimed in claim 14, wherein said first side ring is axially positioned by an annular step formed on the inner corner of said flywheel, and said second side ring is secured in position by one of a curled and deformed inner edge of said flywheel pressed inwardly against said second ring.

* * * * *